Aug. 13, 1963 H. A. CARTWRIGHT 3,100,425
ROAD MAINTENANCE DEVICE
Filed Dec. 11, 1959 7 Sheets-Sheet 1

INVENTOR
Horace A. Cartwright
BY
Basseches
his ATTORNEY

Aug. 13, 1963  H. A. CARTWRIGHT  3,100,425
ROAD MAINTENANCE DEVICE
Filed Dec. 11, 1959  7 Sheets-Sheet 3

INVENTOR
Horace A. Cartwright
BY
his ATTORNEY

United States Patent Office 3,100,425
Patented Aug. 13, 1963

3,100,425
ROAD MAINTENANCE DEVICE
Horace A. Cartwright, Lexington, Ky.
(4106 S. Rockford, Tulsa 9, Okla.)
Filed Dec. 11, 1959, Ser. No. 858,913
15 Claims. (Cl. 94—44)

This invention relates to a road maintenance device, and more particularly to a device for applying bituminous material aggregate surfacing to a roadway.

My invention is concerned with the solution of the problem in surfacing roadways of avoiding inefficiency in correlating the bituminous material and aggregate of stone, insofar as the quantitative relationship of these ingredients to each other is concerned, and also of eliminating irregularities in uniformity of the layers, particularly in the laps occasioned by discontinuity in operation, due either to the daily interruption of work or depletion of materials.

In road maintenance operation involving the use of bituminous material which is spread on a road surface and covered with stone aggregate, efficiency demands the use of heavy grades of bituminous material to secure a strong and effective bond and almost instantaneous application of stone at the highest possible temperature of the bituminous material, which bituminous material sets up rapidly on the road surface. Efficiency of operation also requires the application of the stone aggregate in the wet bituminous material and that the stone be applied uniformly and without streaks and in a single layer. A lag in the application of stone after the spray of bituminous material defeats the formation of an effective bond between the aggregate and bituminous material.

The application of excess stone cannot be effectively corrected by rolling the same in position. Each of the faulty operations becomes a road hazard since driving over a road so covered serves to dislodge the improperly bonded stone, with resulting possible damage.

It is also inescapable that road surfacing operations cannot be continuous beyond the supply of material, and the interruption occasioned by working hours. The halting of operations by reason of each of these circumstances, and perhaps others, results in the problem of, and the need for unusual caution in, effecting a uniform joint, upon the resumption of operations, to secure a uniform and continuous surface.

Accordingly, it is an object of my invention to provide a road surfacing and maintenance device which maintains an automatic relationship between spraying of bituminous material and spreading of road aggregate thereon under temperature conditions to secure the greatest efficiency as to the bond between these materials, and to accomplish the distribution of these materials in relation to each other uniformly.

Still more particularly it is an object of my invention automatically and efficiency to distribute bituminous material and stone aggregate thereon in timed relationship and at a rate of distribution which will assure a uniform and effective surface.

Still more particularly, it is an object of my invention to provide a road maintenance device which will quickly, efficiently and uniformly place bituminous material and stone aggregate in a single layer upon a roadway after interruption of operation, which will assure a continuous surface and eliminate any disturbing overlap or irregularity at the point of resumption of operations.

Still more particularly, it is an object of my invention to provide a device which will assure highly efficient and continuous road maintenance operations.

To attain these objects and such further objects as may appear herein or be hereinafter pointed out, I make reference to the accompanying drawings forming a part hereof, in which—

I now make reference to the accompanying drawings wherein my invention contemplates the provision of a road surfacing device A which may be hauled in its road surfacing operations by a truck B, having in mind that the ratio volumetrically of stone aggregate or chips to bituminous binder is relatively high, to assure uninterrupted operation, for example of the value of twenty tons of aggregate per five hundred gallons of asphalt or bituminous spraying liquid.

My invention is predicated upon having the road surfacing assembly utilize a stone aggregate dump truck B of large capacity to haul forwardly along the road, the surfacing assembly A, which includes generally an auxiliary bituminous tank supply 10 and an aggregate distributor 11, mounted upon a three wheel chassis 12 which is provided with a tongue 13 for connection with the truck B, as will be readily understood.

The chassis 12 has two rear, downwardly depending brackets 14 for the left rear and right rear wheels 15, and a front pivotal bracket 16 for the single front wheel 17 to which the hauling tongue is connected, as will be readily understood.

Rearwardly of the chassis 12, a bituminous tank 18 is supported on the footing 19, with provision for maintenance of the bituminous material at proper temperatures by a burner 20 extending over the bottom wall of the tank, adjacent which is provided the sump S for the outlet O.

Figure 4:
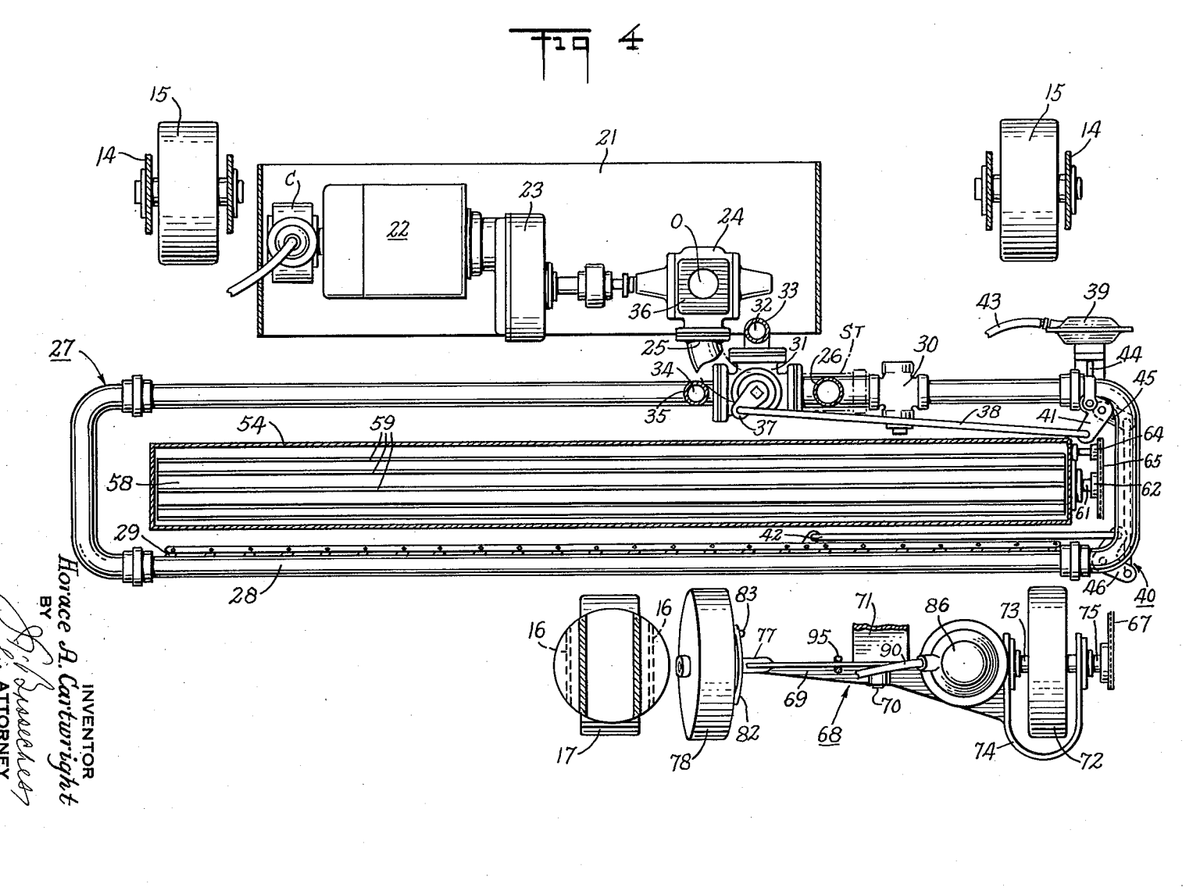
FIGURE 4 is a fragmentary section taken on the line 4—4 of FIGURE 2.
Figure 5:
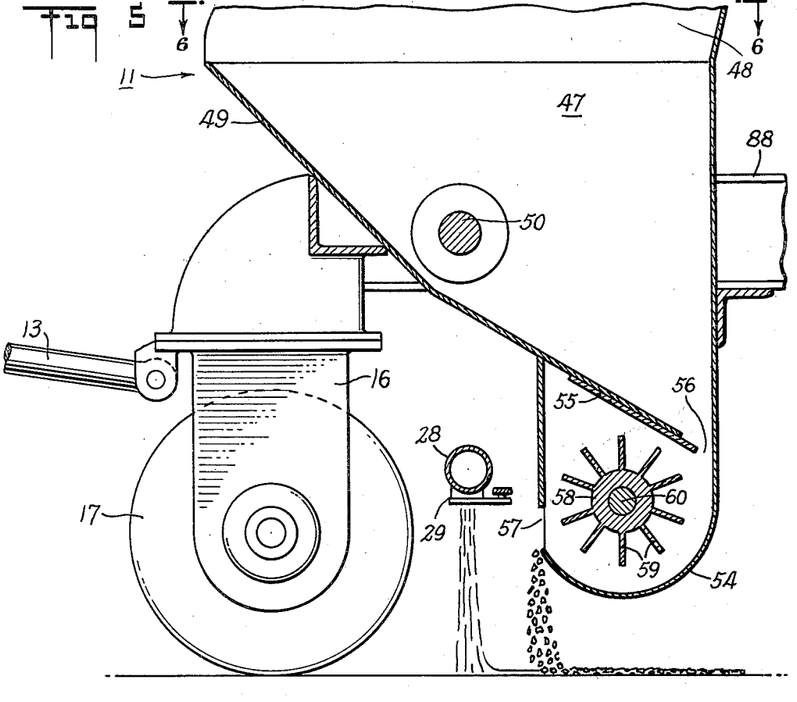
FIGURE 5 is a fragmentary section taken on the line 5—5 of FIGURE 2.
Figure 6:
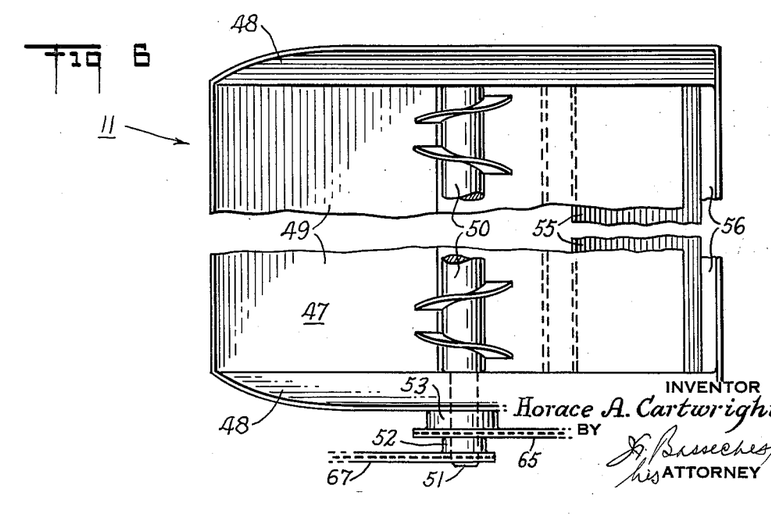
FIGURE 6 is a fragmentary plan taken on the line 6—6 of FIGURE 5.

Rearwardly of the chassis 12, a length of channel forms a shelf 21 which supports an engine 22 as a source of power (FIGURE 4), which, through a reducing gear transmission 23, drives a pump 24 whose outlet 25 is connected to the branch 26 of the sprayer assembly 27, an intermediate strainer ST (not shown) being optionally provided. The sprayer assembly 27 is a looped section of conduit assembly, the front section 28 of which has a spraying nozzle section 29 which may be of the construction shown and described in my Patent No. 2,579,792, dated December 25, 1951. It is to be understood that other spray bars may be used, as such feature is not part of my present invention.

To one side of the strainer ST the conduit assembly 27 includes a three way vent valve 30. To the other side of the strainer ST there is provided a three way cock 31, with an outlet 32 leading to the line 33 which extends to the top of the tank 18. Another outlet 34 leads to the spraying assembly, but along its length may be connected to the line 35, which may connect with the three way cock 36 on the suction side of the pump, with provision, optionally, to connect the suction side of the pump to the sump S of the tank 18.

The cock 31 has an actuating lever 37, to which there is provided a link 38 under actuating control of the air chamber 39 through the linkage of bell cranks and link rods 40, one arm 41 whereof is connected to the link rod 38, and the other arm 46 of which bell crank linkage is connected to the rod 42 for actuating the spray nozzles in accordance with a form exemplified in my patents aforementioned.

It will be understood that pressure in the air chamber 39 through the line 43 extends the plunger 44, linked to the bell crank arms 45 and 46, against the influence of a spring within the air chamber for simultaneous actuation of the cock lever 37 and to open the nozzle assembly 29.

Figure 11:
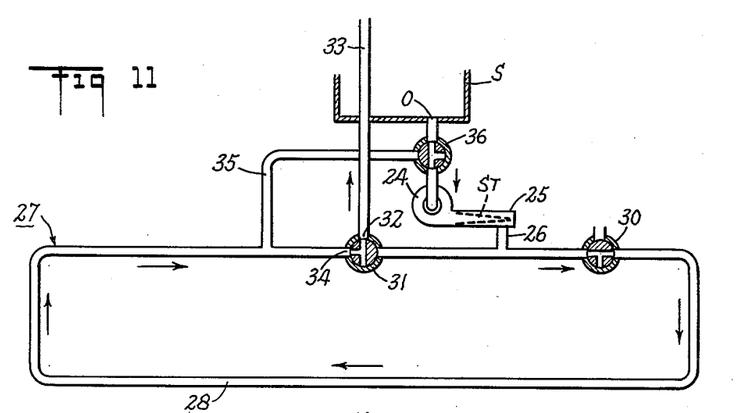
FIGURES 11, 12 and 13 are diagrammatic views of the asphalt flow control line.

Actuation of the valves 30, 31 and 36 through the air chamber 39 may, therefore, optionally by automatic linkage or by manual operation, serve to assume a position as shown in FIGURE 11 wherein, during operation of the pump 24 and the turning of the cock 36 to connect the sump of the tank with the pump, the hot asphaltic material will circulate through the vent valve 30, through the closed spray bar 28, back to the valve 31 which is connected with the pipe line 33 to return the hot asphaltic material to the tank 18. This condition may be assumed when spraying is discontinued for the purposes of assuring a clear line when operations are resumed.

Figure 12:
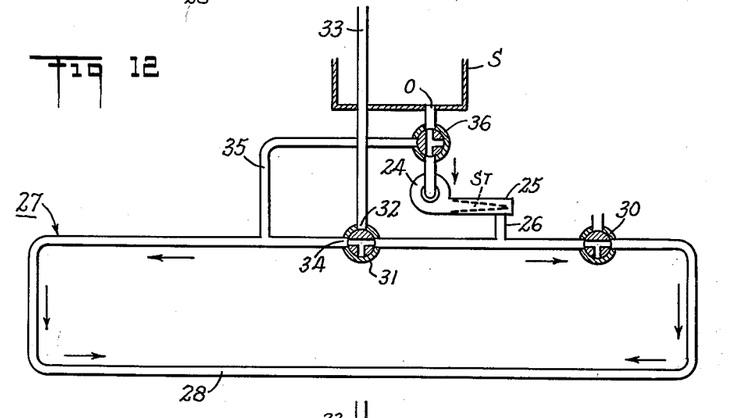

Another position which may be assumed is diagrammatically shown in FIGURE 12 wherein admission of air to the hose 43 leading to the air chamber motor 39 will serve to change the position of the cock 31 so that the pump drives the asphaltic material through the cock 31 in the direction of the arrows, the spray bar nozzle assembly 29, under the influence of the link 42 having also been moved to the open position.

Figure 13:
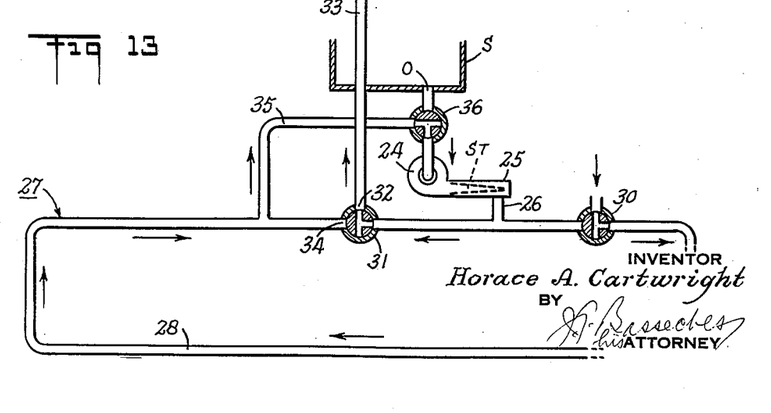

A third position which may be assumed by the cocks 30, 31 and 36 is shown in FIGURE 13 where, upon turning of the cock 36 to shut off the asphaltic material from the tank to the pump, actuation of the pump applies suction to the line 35. The cock 31 is shifted so that the blank thereof is opposite to the position for circulating as shown in FIGURE 11. The spray bar 28 is closed and the air vent 30 is open. The material from the spray bar is thereby drawn into the pump and thence through the line 33 into the tank. The utility of this assembly will be coordinated with the actuation of pressure or lack of pressure in the air line 43, as will appear more clearly as this description proceeds.

Forwardly of the chassis 12, an aggregate hopper 47 has its mouth 48 open to receive the stone aggregate from the dump truck previously described, and which hauls the distributor assembly A. Transversely of the angular bottom wall 49 a screw type agitator and spreader is supported on a shaft 50, one end 51 of which is external of the hopper 47 and is provided with pinions 52 and 53. The hopper bottom wall 49 leads to a gravel spreader chamber 54. A baffle 55 adjustably controls the aperture 56 connecting the hopper 47 with the chamber 54. The chamber 54 has an outlet 57 through which the gravel is deposited by the gravel spreader 58. The gravel spreader 58 has paddle arms 59 extending across the width of the chamber 54. The paddle arms 59 extend from a shaft 60 trunnioned in the side walls, with one end 61 extending on the same side as the shaft 51 and provided with a pinion 62.

On the external wall of the chamber 47 the stub shaft 63 is provided with a pinion 64. A chain 65 is coupled with the pinion 53 and has the flight 66 bearing against the pinion 62 to drive the pinion 62 as the pinions 53 and 64 are driven.

The pinion 52 is coupled by the drive chain 67 on the metering assembly 68, which also serves as the powerizing means for operation of the gravel spreader previously described. This consists of a tiltable axle 69 whose medial point is trunnioned on the stub shaft 70 extending forwardly from the tongue 71, which is maintained axially rigid but vertically pivotal, to support the transversely tiltable axle 69 in accordance with the contour of the road to be paved.

The axle 69 has at the right end of the metering assembly (as viewed in FIGS. 2 and 4) a traction wheel 72 extending from a stub shaft 73 and supported by the U-shaped bracket 74. A sleeve 75 carries a pinion 76 to couple the same to the wheel 72, to which, in turn, the chain 67 is coupled for driving the pinion 52 keyed to the shaft 51 for powerizing the gravel spreader assembly.

The opposite or centrally positioned end of the axle 69 is provided with a screw threaded shaft 77 (see FIGURES 7 and 8) on which the metering wheel 78 is mounted. A screw threaded sleeve 79, to which the wheel is keyed, thereby carries the wheel 78 inwardly and outwardly along the length of the screw threaded shaft 77, a forward motion of the assembly extending the wheel toward the shoulder 80 of the shaft 77 and a rearward turning of the wheel 78 moving the wheel toward the end 81 of the shaft 77. The position which the metering wheel 78 may assume in relation to the roadway is diagrammatically illustrated in FIGURE 10, as will appear as this description proceeds.

The sleeve 79 adjacent the end facing the shoulder 80 carries a tripping disk 82, the inner face of which has a tripping lug 83 near its periphery, to provide an eccentric member.

Normally, the axle 69 is tilted to raise the traction wheel 72 from the ground under the influence of the spring 84 (see FIGURE 2), one end of which spring is attached to the axle 69 and the other end of which is attached to an ear 85 on the air chamber motor 86, which is fixedly supported on a bracket 87 on tongue extending from the chassis frame 88.

The air chamber motor 86 has the usual spring biased contracting diaphragm with a connecting rod 89 coupled to the axle 69 to tilt upon actuation of the axle 69 about the stud shaft 70. Projection influence of the connecting rod 89 is effected by powerizing the air chamber motor 86 by means of air leading to it through the hose 90. For this purpose, the auxiliary engine 22 powerizes an air compressor C which maintains the air storage tank 91 at desired air pressure as a source of air pressure for actuating both air chamber motors 39 and 86.

The air chamber 39 is controlled through the line 43 under the control of the air valve 92, coupling the lever 93 by the pivot arm 94 and the link 95 to the pivotal axle 69 which, in the raised position of the end 77 carrying the metering wheel 78, opens the valve 92 to powerize the air chamber motor 39, thereby actuating the spraying assembly previously described.

Figure 2:
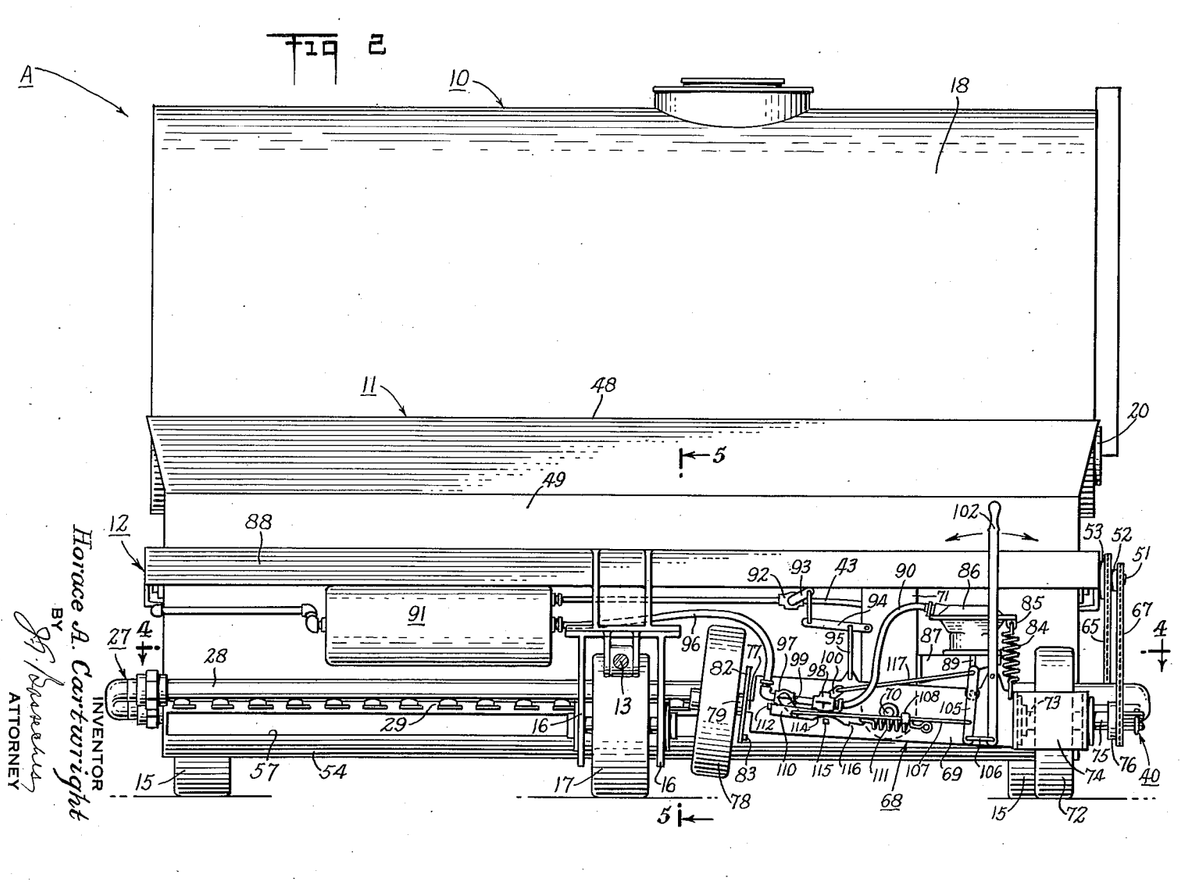
FIGURE 2 is a front elevation of the aggregate and bituminous spraying device in applicating position in accordance with my invention.
Figure 3:
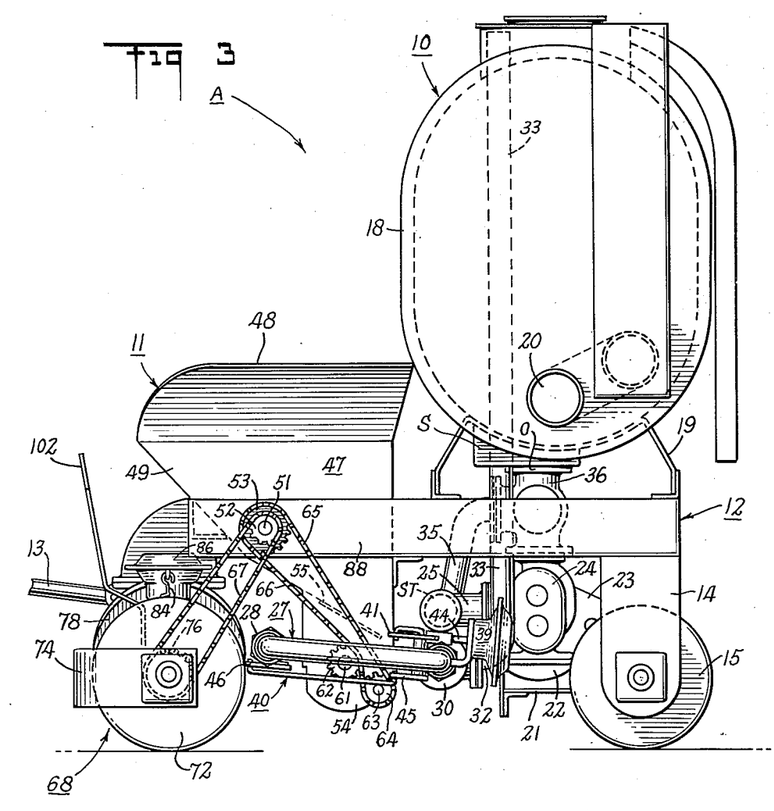
FIGURE 3 is a side elevation from the right side of the same device.
Figure 7:
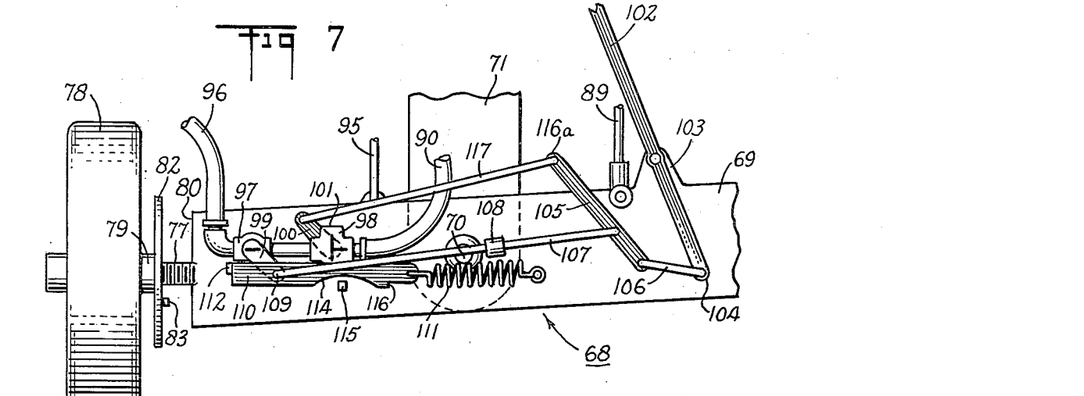
FIGURE 7 is a fragmentary front elevation to illustrate the beginning of the shut off position to stop the surfacing action on depletion of the supply, and to throw the metering wheel into road engagement.
Figure 8:
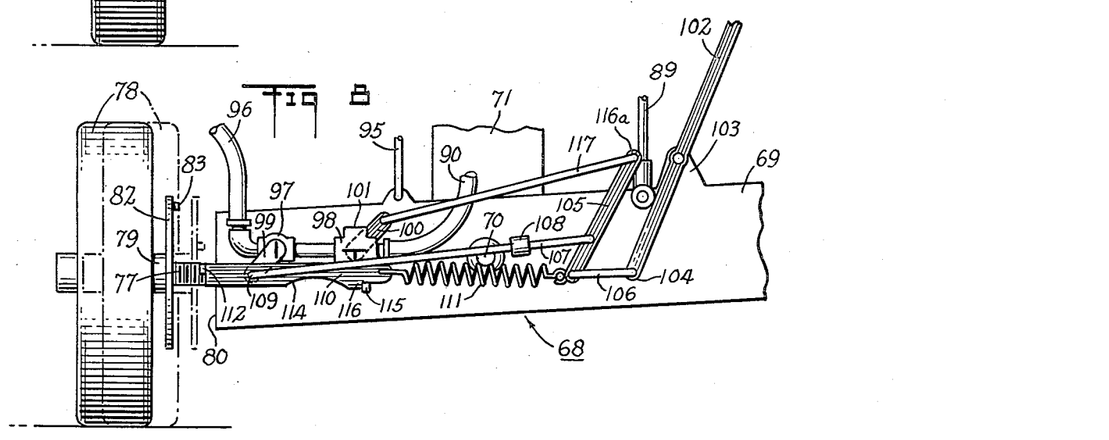
FIGURE 8 is a fragmentary front elevation to illustrate the past cut off position and beginning of rearward metering, parts in dotted lines showing the forward position at about the lap point ready to trip the starting mechanism.
Figure 9:
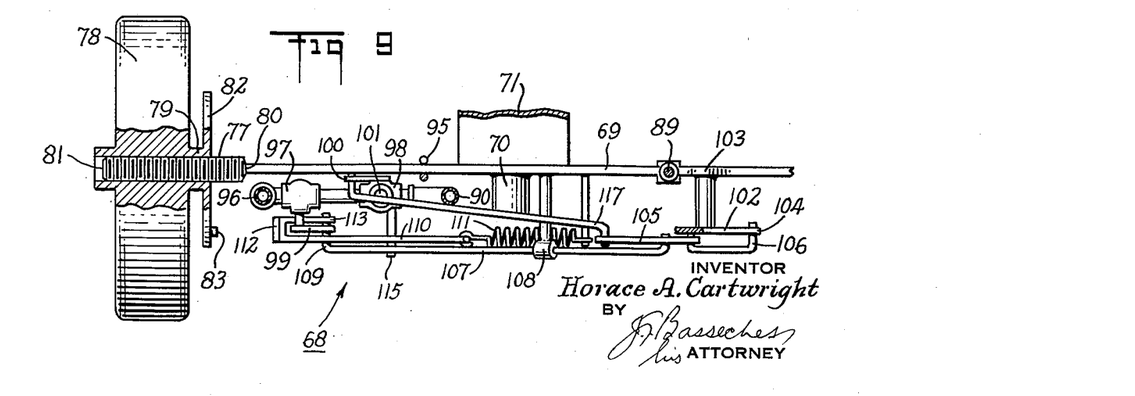
FIGURE 9 is a plan view corresponding to FIGURE 7.

The air chamber motor 86 and its hose 90 are supplied the necessary air pressure through the hose 96 leading to the air storage tank 91 and, under control of the first valve 97 and the second valve 98, each having independent actuating levers 99 and 100, to rotate the valve. In FIGURES 2, 7 and 8, the position of the ports in relation to the housings are shown in heavy black lines, superimposed on the valves 97 and 98. The valve 97 may assume an open and closed position under the influence of the lever arm 99. Valve 98 is a three way valve with one branch 101 of the triple ports arranged to vent the air chamber motor 86 for quickly bringing the metering wheel 78 into contact with the road and raising the wheel 72 from the ground.

Valve 97 can assume a closed position and valve 98 an open position to retain the metering wheel 78 on the roadway and raise the wheel 72 under the manual influence of handle 102 at an intermediate point on the bracket 103, and has its end 104 coupled to the floating lever 105 by means of the link 106. The floating connection permits of a sequence of operation which is desired by relatively independent operation of the operating levers 99 and 100, respectively.

Intermediate the floating lever 105, a draw rod 107 is coupled thereto and is guided adjacent to the lever 105 on a horizontally pivotal guide 108.

The draw rod 107 has an L-shaped, transversely directed branch 109 on its end, which branch 109 serves as a common pivot and coupling for the lever 99 for operating the cock 97, as well as the pivotal fulcrum for the latch 110, at an intermediate point along its length and the end of which is provided with a tripping lug 112 outlined by the U-shaped looped branch 113, through which the draw rod branch 109 passes.

The lever 99 is spanned on opposite faces by the latch 110 and the looped branch 113 to control these members in pivotal connection with each other. When the latch 110 is tilted to unlatched position, it will be drawn outwardly or to the right, as viewed from the front in FIGS. 2, 7, and 8, by spring 111 which has one end attached to the outer end of the latch and is anchored at its other end to the axle 69. The lever 99, being coupled to the latch, will also be moved, or be turned, to the position shown in FIG. 7. The latch 110 has an arcuate bearing edge 114 which assures tiltable clearance when the latch rides on the stud 115 along a guiding edge 114 which terminates in a pawl tooth 116, the operation of which from the dotted line position will also presently become apparent.

The floating lever 105 has its end 116a connected by the link 117 to the pivotal lever 100 for controlling the pivotal movement of the valve 98 as the levers 102 and 105 are moved to various pivotal positions, as more clearly shown from an inspection of FIGURES 2, 7 and 8.

By the foregoing arrangement, the operation for securing accurate lap will now become evident.

Figure 1:
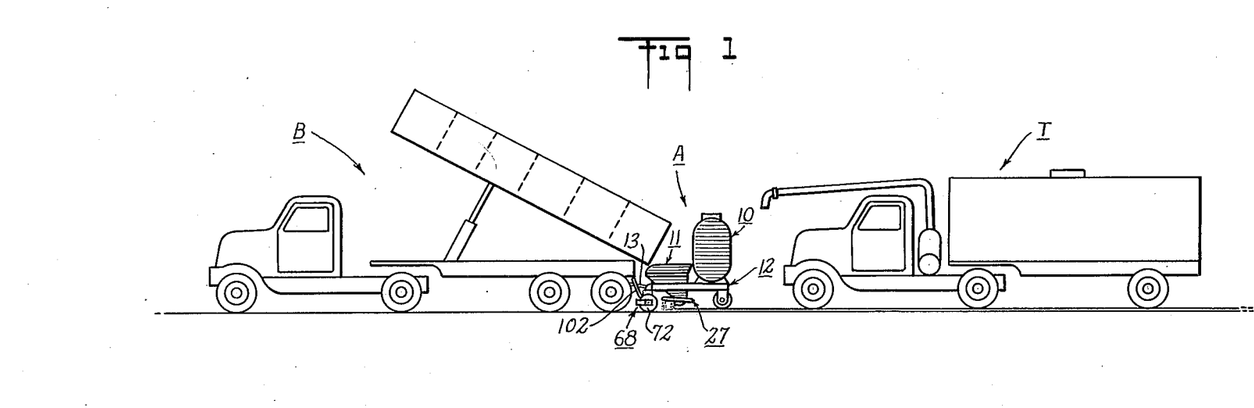
FIGURE 1 is a diagrammatic side elevation showing the relation of my road maintenance device in use with a stone aggregate supply truck.

In operation, heavy bituminous material is pumped into the auxiliary tank 10 by the supply truck T shown in FIGURE 1, preferably at spraying temperatures, and this hot material is circulated through the spray bar assembly 29 with the nozzles closed by the hook-up of the valves as shown in FIGURE 11, to bring the temperature of the spray bar and nozzles up to the temperature of the material, the engine 22 and pump 24 on the unit being so adjusted that a proper amount of the bituminous material is circulating through the spray bar of the assembly. The metering wheel 78 of the distributor 11 is brought to the parting line on the roadbed so that the metering wheel 78 is ready to assume a raised position, such as shown in FIGURE 2.

The dump truck B with the gravel or stone is backed into position and hooked onto the distributor unit 11 through the coupling 13, and the body raised to fill the hopper 47. Thereupon the dump truck B and the distributor unit 11 are ready for the metering operation, care being exercised that the metering wheel 78 is along the center of the threaded shaft 77, as shown in FIGURE 7, and that the spray bar is in the desired position to start operating. The truck and distributor unit are then backed a few feet to reach point C' of FIGURE 10. In so doing, the wheel 78 is threadedly rotated on the shaft 77 to move toward the outer end 81.

Thereupon the actuating lever 102 is drawn back from the position shown in FIGURE 7 to the position shown in FIGURE 8, which projects the latch 110 against the spring pressure 111 and latches the tooth 116 onto the stud 115. This arranges the sequence valves 97 and 98 to powerize the air chamber 86 and bring the feed drive wheel 72 into contact with the road when the forward movement to point A' (FIGURE 10) trips latch 110 as lug 83 strikes the tripping lug 112. The dump truck B is then started forward, to draw the distributor at the proper speed in the direction of the parting line. This operation serves threadedly to return the road contacting metering wheel 78 and to move it on, and inwardly, along the shaft 77 until the tripping lug 83 has its path of movement intersect the lug 112, to trip the same and to tilt and pivot it about the draw rod branch 109, to disengage the tooth 116 at its opposite end from the stud 115, activating the spring 111 to release the latch and pivot the lever 99, to move the valve 97, resulting in the position shown in FIGURE 2 at the instant the distributor assembly reaches the parting line.

With this occurrence, a tilting movement of the axle 69 occurs, to open the air valve 97 and powerize the air chamber 86, to push the wheel 72 and to open sequentially the air valve 98 to admit air to the air chamber 86 and contact the wheel with the road, which wheel drives the feed screws of the hopper 48. This movement is against the spring 84. The downward movement of wheel 72 is accompanied by the simultaneous opening of the valve 92 through the linkage 93, 94 and 95 connected to the axle 69. The opening of the valve 92 powerizes the chamber motor 39 through the air line 43 under the control of the valve 92. Powerizing the chamber motor 39 activates the linkage 40 connected to the spray nozzle assembly 29 in shifting the valve 31 from the circulating position diagrammatically shown in FIGURE 11 to the spraying position diagrammatically shown in FIGURE 12.

In the course of exerting the driving wheel 72 against the roadway, the driving wheel rotates the shafts 51, 61 and 63 through the medium of the chains 65 and 67, previously described, to provide means for distributing the gravel through the hopper while the spray assembly is operating, in proper proportion to each other. The truck B proceeds down the road, feeding aggregate into the hopper 47 of the distributing unit 11 at a predetermined rate of movement during this entire operation. When the body of the dump truck B has used up its gravel and the hopper 47 on the distributing unit is nearly empty, the operating handle 102 is pushed manually, to rotate the valve 98 to the closed position and shut off the air supply from the air chamber motor 86 which holds the driving wheel 72 in driving position. This same movement of the lever 102 sequentially vents the air chamber motor 86, allowing the spring 84 to raise the driving wheel off the roadway, stopping the feed of the gravel or aggregate from the spreader of the hopper. The consequent tilting of the axle 69 results to lower the bar 94 and move the lever 93 of the bitumen control valve 92, thereby shutting off the air supply along the line 43 to the chamber motor 39 and shutting off the spray bar while also positioning the metering wheel 78 in contact with the roadway, to rotate the wheel forwardly on the threaded shaft on which it is mounted. This forward rotation threads the wheel 78 inwardly on the axle 69 previously described, whereupon the forward movement of the dump truck B is stopped.

It is convenient then to back the truck B so that the distributor unit 11 is backed onto the finished surface. This backing procedure reversely moves the metering wheel 78 toward the end 81 of the shaft 77. At this stage, the truck B may be unhooked and a loaded truck backed into position and hooked onto the unit 11, in which position the operating lever 102 and the floating lever 105 to operate the sequential air valves 97, 98, are pulled out to reset the valves 97, 98.

Should the bitumen in the auxiliary tank 18 require replenishment, it may conveniently be done at this time.

Also, in view of the forward position of hauling of the distributor assembly 11 with relation to the dump truck, great facility is experienced in the control of the distributor assembly by the dump truck B.

At the time of effecting replenishment of the supply of aggregate, a condition exists where the distributor unit A has been backed rearwardly of the end of the previous paving operation and the cutting off of the air valves is accompanied by a rearward movement of the lever 102 to set the latch 110 into latched position. The backing of the truck B has thereupon moved the metering wheel 78 from the exact point of cut-off toward the outer end 81 of the shaft 77, leaving the assembly in readiness so that when the truck is moved forward again, it will turn the metering wheel 78 for the exact number of said turns until it will trip the latch 110 as it reaches the exact position where the distributing operation has previously been cut off, to activate the air chamber motor 86 and drop the driving wheel 72 and raise the metering wheel 78, as previously described. The feed of aggregate and bitumen is, therefore, coordinated with exactness in time and at the prescribed rate of movement, to achieve correct apportionment.

Description will not be made of the adjustment of the nozzles for proper lap of the spray on the road surface as this control will be readily understood, and particular reference is made to my patent aforementioned for such expedient.

During non-use of the equipment as at the end of a working period, manual or automatic means may be used to set the valves 30, 31 and 36 into position for either circulating in a closed circulating system, as diagrammatically shown in FIGURE 11 and previously described, or, when the equipment is to remain unused and will cool off, the valves 30, 31 and 36 may be positioned to evacuate the spray bar assembly before the bitumen solidifies. For this purpose, the pump may be operated to evacuate the bituminous material from the spray bar, and return it to the tank 10 by closing the valve 30, connecting the valve 31 with the line 33, and positioning the valve 36 to have the suction side of the pump 24 connected with the line 35. When the lines are cleared, the system may be permitted to cool.

Figure 10:
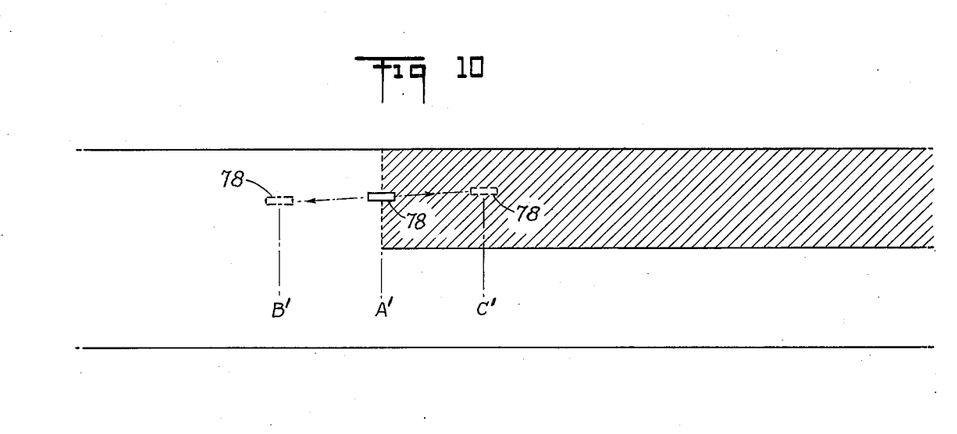
FIGURE 10 is a diagrammatic plan view to show the positions at lap point or past lap point and pre-lap point of the metering wheel.

It will also be understood that the sequence of operation may include the following: during operation as the paving progresses, the truck B draws the assembly toward the exhaust condition at joint A', whereupon the handle 102 is moved to the off position and thereupon the truck is stopped beyond the point A', at the point B'. This is accompanied by the driving wheel 72 jumping from contact with the road and the metering wheel 78 is pressed into contact with the road to roll to the position B'. The truck then backs the unit A onto the covered section, to point C', and is unhooked. The tank unit is recharged. The joint A' is then swept to give a clean, even edge and the handle is moved to the on position. The truck is drawn forward again, with the metering wheel 78 in contact with the paved road as a result of movement by the handle 102. The metering wheel 78 rolls to the joint A' and there trips the latch 110. At joint A', operation is re-resumed as already described.

By the construction described, road paving and maintenance operations are assured with maximum economy and efficiency, minimal interruptions of operation, uniformity of deposition and elimination of poor joints between succeeding applications, which may occur by reason of interruptions.

Having thus described my invention and illustrated its use, what I claim as new and desire to secure by Letters Patent is:

1. A road surfacing and aggregate distributing device comprising, in combination, a wheeled supporting frame adapted to be hauled on a roadway to be surfaced, a bitumen spraying assembly carried by said frame, an aggregate hopper and spreading assembly, each of which assemblies having distributing outlets, air powerized means for actuating said spraying means, flow control means for said spraying means, a tiltable axle coupled to said last control means, said tiltable axle having wheeled driver means arranged to be coupled to said second assembly distributing outlet, air chamber motor means for urging said driver wheel into road contacting engagement and valving means for controlling said air supply to the air chamber motor means, a metering wheel on said axle opposite to said driver wheel for contacting said roadway upon raising said driver wheel, said metering wheel having a screw-threaded sleeve threadedly mounting the metering wheel on the axle for axial movement, a lug on said metering wheel, manual means for tiltably positioning said axle to urge said metering wheel into road contacting position while disengaging said driver wheel from the road, and latch means for engagement by the said lug to restrain said axle in said metering wheel tilted position, said latch means and metering wheel having cooperative engagement predeterminedly to release said latch means, and linkage between said latch means and said valving means to actuate said air chamber motor to direct said driving wheel into road contact while simultaneously actuating said flow control means for said spraying means.

2. A combined road surfacing and aggregate distributing device in accordance with claim 1 wherein said valving means comprises in line, sequentially positioned valve members, with the trailing valve having an air exhaust port for releasing the pressure of said chamber motor and spring biased means for urging said metering wheel in road contacting engagement upon release of said pressure in said air chamber motor.

3. A roadway surfacing and aggregate distributing apparatus adapted to be hauled by truck, said apparatus comprising, in combination, a wheeled supporting frame, a bitumen spraying assembly carried thereon, an aggregate material spreading assembly on the frame adjacent to the spraying assembly, means operatively connected with said spraying assembly for effecting the distribution of bitumen over an underlying surface, means operatively connected with the aggregate assembly for effecting the distribution of material from the aggregate spreading assembly onto the sprayed bitumen, mechanism common to said assemblies and operatively connected thereto for controlling the operation thereof and the distribution of material therefrom, and means carried on said wheeled supporting frame for movement relative to and into and out of operative engagement with an underlying roadway and operatively coupled with said mechanism for alternatively putting the said means of said assemblies into and out of operation.

4. A roadway surfacing and aggregate distribution apparatus adapted to be hauled by a truck, said apparatus comprising, in combination, a wheeled supporting frame, a bitumen material spraying assembly carried thereby, an aggregate material spreading assembly on the frame adjacent to the spraying assembly and in position to spread aggregate onto and to cover the sprayed bituminous material, mechanism connected with said spraying assembly for effecting the discharge of bituminous material from said spraying assembly, mechanism operatively connected with said material spreading assembly for actuating the latter to effect discharge of aggregate material therefrom, a driver wheel, means supporting the driver wheel from the frame for movement into and out of engagement with the roadway, means operatively coupling said wheel with the aggregate spreading assembly operating mechanism and with the bituminous material discharge effecting mechanism to actuate the said mechanisms upon engagement of the wheel with the roadway, means connected with the driver wheel supporting means for effecting movement of the wheel into and out of engagement with the roadway, means for securing said wheel in elevated position from the roadway, means maintaining the bituminous material discharge effecting mechanism inoperative while said wheel is secured in elevated position, a second wheel supported for simultaneous movement with and in the opposite direction to the driver wheel for engagement with the roadway when the driver wheel is elevated, means actuated by said second wheel when in contact with the roadway and upon a predetermined rotation thereof for effecting release of the said driver wheel securing means to permit movement of the driver wheel into engagment with the roadway, and means for making operative the bituminous material discharge effecting mechanism upon such release of the secured driver wheel.

5. A road surfacing apparatus adapted to be hauled along a roadway comprising, in combination, a wheeled supporting frame, a bitumen spraying assembly and an aggregate spreading assembly on the frame in adjacent relation to each other, control mechanism operatively connected with and for effecting the distribution of material from the first named assembly, control mechanism operatively connected with and for effecting the distribution of material from the second named assembly, a tiltable axle suspended from the wheeled supporting frame, wheel members on said axle for alternative contact with the roadway by tilting of said axle, one wheel constituting a driver wheel in operative connection with the aggregate spreading assembly mechanism for distributing said aggregate from the latter, manual means for tilting said axle to move said other wheel into roadway engaging position, means for latching said tiltable axle to hold the said other wheel in roadway engaging position, tripping means on said other wheel to release said tiltable axle upon a predetermined rotation of said other wheel in one direction to permit movement of said driver wheel into road contacting position, and mechanism maintaining the control mechanisms for the assemblies inoperative while the tiltable axle is in latching position and for putting said control mechanisms in operation upon unlatching of the axle and the engagement of the driver wheel with the roadway.

6. A road surfacing apparatus adapted to be hauled along a roadway comprising, in combination, a wheeled supporting frame, a power operated spraying assembly and an aggregate spreading assembly mounted on said frame adjacent to each other, mechanism for and operatively connected with each assembly for effecting discharge of materials from the respective assemblies, control means for the material discharge effecting mechanism of said spraying assembly, control means for the material discharge effecting mechanism of said spreading assembly, a tiltable axle carried by the frame, the opposite ends of said axle having a first wheel and a second wheel thereon, a coupling between said axle and said control mechanism for the first named assembly, manual means connected with and for tilting said axle whereby to urge said second wheel into roadway contacting position, a driving coupling between said control mechanism for the second assembly and the first wheel, latching means to hold said manual means in a predetermined position relative to said second wheel and an element carried by the second wheel in a position to engage said latching means and effect release of said latching means to permit movement of the first wheel into driving roadway engagement after a predetermined extent of rotation in one direction of said second wheel.

7. A road surfacing apparatus comprising, in combination, a wheeled supporting frame adapted to be hauled along a roadway, a bitumen spraying assembly and an aggregate spreading assembly on said frame, said assemblies having outlets in close adjacency to each other, mechanism carried by the frame for controlling bitumen discharge from the spraying assembly outlet, a tiltable support means mounted on the frame and operatively coupled to the control mechanism for said spraying assembly, a driver wheel on said tiltable support means, aggregate moving means forming a part of the aggregate spreading assembly for moving aggregate through the aggregate outlet, a driving connection between the driver wheel and said aggregate moving means, a second wheel on said support means for alternative contact with said roadway when said driver wheel is moved from road contacting position, manual means for tilting said support means, means for latching said support means tilted with said second wheel in road contacting engagement, means on said second wheel for tripping said latching means on a predetermined extent of rotation of said second wheel, and power operated means for urging said driver wheel into road engagement upon the tripping of said latching means.

8. A road surfacing apparatus comprising, in combination, a wheeled supporting frame adapted to be hauled along a roadway, a bitumen spraying assembly and an aggregate spreading assembly mounted on said frame, said assemblies having outlets in close adjacency to each other for coordinating the deposit of bitumen and aggregate on the roadway, means controlling the discharge of material from each of said outlets, a tiltable axle supported on the frame and carrying first and second wheels for alternative positioning in contact with the roadway, said first wheel being operatively coupled to said control means for said aggregate spreader for driving the same, the said second wheel being threadedly mounted on the axle for axial movement between an inner and an outer position thereon in accordance with the number of forward and reverse rotations transmitted to the second wheel, means connected with said axle for manually tilting the axle for selective engagement of said wheels with the roadway and to actuate said control means, mechanism for latching the axle in a tilted position with said second wheel in road engaging contact, cooperating means carried by said second wheel and said latching mechanism for effecting release of said latching mechanism upon a predetermined forward rotation of said second wheel for permitting lifting of the second wheel from roadway engaging contact and for permitting said first wheel to be lowered into road engaging contact to actuate said spreader control means, and means operatively coupling the axle with the frame for tilting the axle following release of the latching means to lift the second wheel and lower the first wheel.

9. A road surfacing apparatus comprising, in combination, a wheeled supporting frame adapted to be hauled along a roadway to be surfaced, a bitumen spreader assembly carried by said frame, an aggregate hopper and spreading assembly carried by the frame, said assemblies having material discharging outlets in close adjacency to one another, power operated means on the frame connected with and for delivering bitumen to said spraying means, means controlling flow of bitumen from said spraying means, a tiltable axle supported on said frame and operatively coupled to said control means for said spraying assembly to alternatively start and stop operation of said spraying means when tilted from one position to another, said tiltable axle carrying a first wheel having driving connection with said spreader assembly, a second wheel carried by the tiltable axle, means connected to said axle for manually tilting the axle for selective engagement of said first and second wheels with the underlying roadway, valve controlled fluid power operated mechanism operatively coupled with said axle for urging tilting of the axle in a direction to move said first wheel into roadway engaging contact and cooperating control means carried by said second wheel and axle for actuating the valve of said valve controlled mechanism.

10. The invention according to claim 9, wherein the means coupling said second wheel with said elongate member is a threaded coupling such that the second wheel moves in one direction axially on the elongate member to triggering position while rotating in one direction.

11. The invention according to claim 9, wherein the said second wheel triggered mechanism is carried entirely upon said elongate member.

12. A road surfacing apparatus comprising, in combination, a wheeled supporting frame adapted to be hauled along a roadway, a bitumen spraying assembly carried by said frame and including spray nozzles and a first valve controlling flow of bitumen to the nozzles, an aggregate handling assembly on the frame including a hopper and means for ejecting aggregate therefrom, a first fluid pressure motor on the frame, mechanism connected between said motor and said valve for actuating the latter, a second valve means controlling flow of pressurized operating fluid from a pressure source to said motor, an elongate member pivotally suspended intermediate its ends from the frame for tilting in a substantially vertical plane extending substantially perpendicular to the path of travel of the frame, a first wheel and a second wheel, said wheels being rotatably supported on opposite ends of said elongate member for alternate contact with the roadway, a driving connection between the said first wheel and said aggregate ejecting means, a second fluid pressure operated motor operatively connected with said elongate member at a point thereon to turn the latter to a first tilted position when energized and in which position the first wheel is brought into engagement with the roadway, a third valve means controlling flow of pressurized fluid from said source to said second motor, means normally urging tilting of said elongate member to a second tilted position to raise the first wheel and lower the second wheel into contact with the roadway when the second motor is inactivated, releasable means for holding the elongate member in the said second tilted position, and mechanism operatively connected with said second and third valve means and said second motor which is triggered into operation by the second wheel upon a predetermined rotation of the latter for effecting actuation of the second and third valve means whereby said first and second motors function respectively to open the first valve and to move the first wheel into roadway engaging position.

13. A road surfacing apparatus comprising, in combination, a wheeled supporting frame adapted to be hauled along a roadway, a bitumen spraying assembly carried by said frame and including spray nozzles and a first valve controlling flow of bitumen to the nozzles, an aggregate handling assembly on the frame including a hopper and means for ejecting aggregate therefrom, a first fluid pressure motor, mechanism connected between said motor and said valve for actuating the latter, a second valve controlling flow of pressurized operating fluid from a pressure source to said motor, an elongate member pivotally suspended intermediate its ends from the frame for tilting in a substantially vertical plane extending susbtantially perpendicular to the path of travel of the frame, a first wheel and a second wheel, said wheels being rotatably supported on opposite ends of said elongate member for alternate contact with the roadway, a driving connection between the said first wheel and said aggregate ejecting means, a second fluid pressure operated motor on the frame, means connecting said second motor to said pivotally supported elongate member on one side of the pivot suspension thereof whereby activation of the second motor effects turning of the elongate member to a first position to lower the first wheel into contact with the roadway, a third valve means controlling flow of pressurized fluid to the second motor from said source and reversely from the second motor to the atmosphere, an operative coupling between said elongate member on said one side of the pivot and the second valve means to open the latter upon the activation of the second motor, means coupling the elongate member with a fixed part of the apparatus and normally urging turning of the elongate member to a second position to raise the first wheel and lower the second wheel to the roadway when the second motor is inactivated, means movably carried by the elongate member and coupled to the third valve means for moving and holding the latter means against activation of the second motor while the second wheel is in engagement with the roadway, and means carried by the second wheel whereby the latter will effect movement of said means movably carried by the elongate member upon a predetermined rotation of the second wheel in one direction and movement of the third valve means for activation of the second motor.

14. The invention according to claim 13, wherein the said means movably carried by the elongate member comprises a sliding member supported for movement toward the second wheel against a retracting force, means for manually moving said sliding member toward the second wheel, means for latching the sliding member in a set position when so manually moved where the third valve means is set to maintain the second motor inactive and said means carried by the second wheel comprising a lug positioned to engage and unlatch said sliding member.

15. The invention according to claim 13, wherein the second wheel is screw threaded on the elongate member to move in an axial direction and cause the said movement of said movable means after the said predetermined rotation of the second wheel.

References Cited in the file of this patent

UNITED STATES PATENTS

| | | |
|---|---|---|
| 1,613,051 | Napier | Jan. 4, 1927 |
| 1,750,104 | Heltzel | Mar. 11, 1930 |
| 2,579,792 | Cartwright | Dec. 25, 1951 |
| 2,669,915 | McConnaughay | Feb. 23, 1954 |
| 2,833,542 | Martin | May 6, 1958 |
| 2,906,438 | Carpenter | Sept. 29, 1959 |
| 2,925,201 | Peoples | Feb. 16, 1960 |